United States Patent [19]

Curetti et al.

[11] 4,324,541
[45] Apr. 13, 1982

[54] APPARATUS FOR MANUFACTURING AN OBJECT IN PLASTICS MATERIAL

[75] Inventors: Ennio G. Curetti; André M. Collombin, both of Grand-Lancy, Switzerland

[73] Assignee: Motosacoche S.A., Geneva, Switzerland

[21] Appl. No.: 168,370

[22] Filed: Jul. 10, 1980

Related U.S. Application Data

[60] Division of Ser. No. 923,084, Jul. 7, 1978, Pat. No. 4,243,620, which is a continuation of Ser. No. 692,508, Jun. 3, 1976, abandoned.

[30] Foreign Application Priority Data

Jun. 13, 1975 [CH] Switzerland .................. 7666/75

[51] Int. Cl.³ .......................... B29F 1/00; B29F 1/05
[52] U.S. Cl. ............................ 425/562; 425/130; 425/523; 425/548; 425/550; 425/552; 425/574
[58] Field of Search ............. 264/45.1, 46.4, 512, 264/513, 515, 516, 523, 532, 537–539, 255, 275, 279, 312, 328.7, 328.12; 164/113, 136, 320; 425/523, 533, 562, 563, 574, 577, 468, 130, 566, 548, 550, 552; 249/63

[56] References Cited

U.S. PATENT DOCUMENTS

| | | | |
|---|---|---|---|
| 2,773,284 | 12/1956 | Kelly | 425/566 |
| 3,023,458 | 3/1962 | Seymour | 425/566 X |
| 3,305,892 | 2/1967 | Heider | 264/537 X |
| 3,511,845 | 5/1970 | Scalora | 264/294 |
| 3,759,315 | 9/1973 | Smart | 164/120 |
| 4,005,164 | 1/1977 | Procter | 264/550 |

*Primary Examiner*—Jan H. Silbaugh
*Attorney, Agent, or Firm*—Young & Thompson

[57] ABSTRACT

Apparatus for producing hollow plastic articles in a hollow die with a relatively smaller reciprocating punch therein. Plastic material is fed from a nozzle aligned with the die, into the die about the punch, the punch being initially advanced into the opening of the die and retracting as the plastic is introduced from the nozzle. When the plastic introduction is completed, then the nozzle is slid laterally on the die until the duct of the nozzle is out of registry with the die and the nozzle thus closes the die. Then the punch is advanced within the closed die to compress the plastic material into the space between the die and the punch.

2 Claims, 20 Drawing Figures

APPARATUS FOR MANUFACTURING AN OBJECT IN PLASTICS MATERIAL

This application is a division of our copending application Ser. No. 923,084, filed July 7, 1978, now U.S. Pat. No. 4,243,620, issued Jan. 6, 1981, which is a continuation of our copending application Ser. No. 692,508, filed June 3, 1976, now abandoned.

Various methods are known and used for producing objects in plastics materials, particularly hollow bodies, but all of these methods have certain limitations which the method herein proposed attempts to overcome.

The most widely used method is blow-extrusion.

This method makes use of a tube extruded in a press through a die; the tube hangs down under its own weight and is then introduced into a mold where the tube is expanded against the walls of the mold and is welded up at its lower end. The burrs are then trimmed off around the neck and base.

Limitations are imposed upon this method by the difficulties in controlling a blank or tube, hanging from the die without support and subjected to the effect of ambient temperature and of air currents, the impossibility, with certain plastics materials of obtaining gualities (e.g. viscosity and cohesion of the melted material) enabling a blank which does not tear under its own weight to be obtained, the need for complicated means for adjusting thicknesses of the walls at various places, and, in particular, the creation of waste in the order of 20 to 50% depending upon the shape of the bottle.

The production of hollow bodies having a composite wall by this method has hitherto failed because of the impossibility of effecting satisfactory and separate bonding of each layer of material used.

Hot shaping is a method that has been considerably more widely used in recent years, but it is generally limited to the production of hollow bodies having no reverse taper, such as cups.

It requires expensive plant, if it is borne in mind that a production line for providing sheet material is needed if it is to be possible to recover waste which may be as high as 50%.

It has been possible to produce multi-layer products by this method, but the multi-layer sheets require very costly co-extrusion equipment, and the multi-layer waste cannot be recovered if the layers have been bonded together by chemical means.

Injection-molding is at present used for producing hollow bodies having no reverse taper; this method results in products having considerable weight, the thickness of the walls being determined by the dimensions of the spaces required for enabling the material to flow.

Blow injection-molding is a method that has been developed to combine the features of injection-molding (which provides a blank of generally cylindrical or conical form with a closed base supported by a core) with those of blow-extrusion (inflation of this blank in a blow-mold) carried out in a following stage.

Nevertheless, this promising method suffers from the following disadvantages:

very high cost of machines and tools in view of the complexity of the system and the precision required, difficulty in ensuring concentricity of the core and distribution of the material in the case of hollow bodies having narrow necks, in this case, the very high injection pressures tend to cause displacement of the core, and therefore uneven wall-thickness of the blank, and difficulty in the control of heat which is essential for obtaining a blank of suitable quality for the blowing operation which requires very hot portions (side portions) which are very close to very cold portions (bottom and neck of the bottle).

In particular, since injection-molding of the blank is carried out at high pressure (600 to 1200 $kg/cm^2$), the material tends to pass in threads through the capillary nozzles necessary for enabling the blank to be separated from the plasticizer.

These threads which pass into the mold along different paths will become lodged at different points in the blank, and the different thermal history that they have undergone creates uneven internal stresses in the blank which will also be present in the finished bottle.

Many other existing methods might also be mentioned. However a method of manufacturing a blank, that is suitable for processing by various shaping methods, has not yet been developed.

Hitherto it has been necessary in practice to shape the blank in dependence upon the method (drawing, blowing, hotshaping etc.) used for obtaining the required finished article of plastics material.

The present invention provides apparatus that avoids the drawbacks of the apparatus for practicing above-mentioned methods and produces a blank which can be converted to its final form by any of the existing shaping processes.

The operation of the present apparatus for manufacturing a blank in plastics material is characterized in that a quantity of plastics material is introduced into the cavity of the mold, in that the flow of the material is controlled while it is being introduced into the mold cavity, by displacing at least part of the punch relatively to the die, in that the punch is subjected to a restraining action while the material is being introduced, and in that the cavity is sealed and the plastics material contained therein is then compressed by displacing at least part of the punch in relation to the die.

The apparatus for carrying out this method is characterized in that it comprises a mold which has a die, an orifice for introducing the material, and a punch, of which at least a part is axially displaceable in relation to this die, and in that the punch is subjected to a restraining action which controls the flow of the plastics material entering the mold cavity, particularly by lamination of the material.

The annexed drawings illustrate diagrammatically and by way of example a form of construction of apparatus in accordance with the present invention, as well as some modified constructions.

FIGS. 14 to 14c show schematically a variant of the use of the invention.

To produce an object and, in particular, a blank that can be subsequently shaped by any one of various known processes, such as hot shaping, blow-molding, vacuum-molding, mechanical and/or pneumatic drawing or other combined methods, it is necessary for the material of which the blank is made to be as uniform as possible. It is not enough for the blank to be symmetrical; it is also necessary for the material of which the blank is made to be free from internal stresses, or for the unavoidable residual stresses to be limited and, for example, distributed symmetrically.

The annexed drawings illustrate very diagrammatically a form of construction of apparatus whose operation will be described stage by stage by reference to these drawings.

The apparatus includes a mold comprising a die 1, the temperature of which can be controlled; the die has a cavity 2, with walls of a shape that correspond to the outside dimensions of a finished blank. The upper end of this die is closed by a sliding end-piece 3. The mold also comprises a punch 4 which extends longitudinally through the cavity 2 and is connected to the end-piece 3. In the example illustrated, this punch 4 is constituted by two parts, one of which slides within the other, which arrangement enables the blank to be subsequently inflated.

In the example illustrated, the entire punch is displaceable, against a restraining action, in relation to the die; however, in modified arrangements, only one part of this punch referred to as the movable part is displaceable in relation to the die while the material is being introduced into the mold cavity. This punch 4 is solidly connected to a pneumatic or hydraulic piston 5 which is slidable in a chamber 6 of a cylinder 7.

The lower end of the die 1 has an orifice for introducing the plastics material into the mold cavity which is closed by a laterally displaceable nozzle 8 having an inlet duct 9 for plactics material, held at the required temperature by means of a known control system, and supplied with plastics material in the customary way by a press (not illustrated).

This nozzle, by a gentle rubbing movement across the end face of the die 1, is displaceable between a position in which the duct 9 is concentric with the inlet orifice and a closing position wherein a cold surface 10 closes this orifice.

Figure 1:
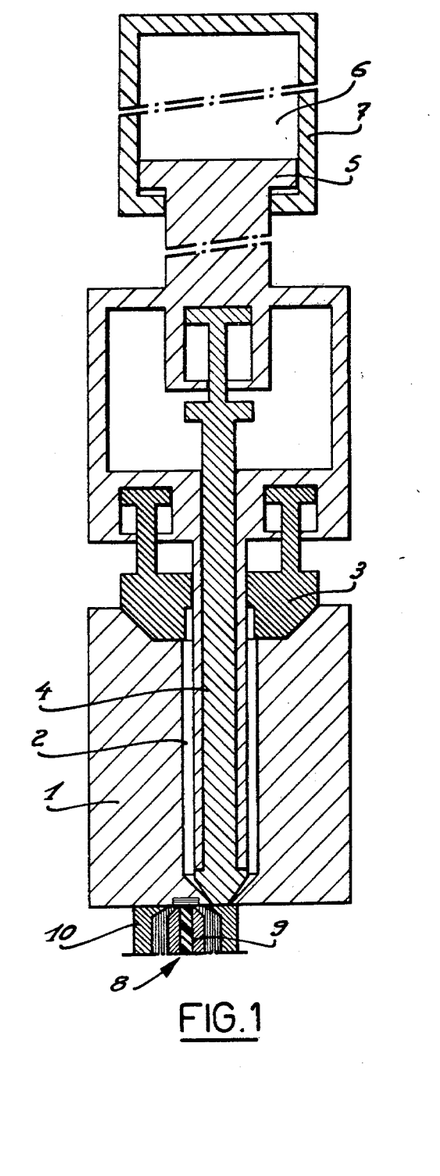
FIGS. 1 to 6 illustrate different stages in the use of the apparatus.

In the initial position, illustrated in FIG. 1, the punch 4 is fully introduced into the cavity 2 and closes the inlet orifice, the end face of the punch being in contact with the cold surface 10 of the nozzle.

To produce an object, in particular a blank, the following operations are carried out:

1. The nozzle is displaced relatively to the die 1 to bring the inlet duct 9 for the plastics material into alignment with the inlet orifice (see FIG. 2).

Figure 2:
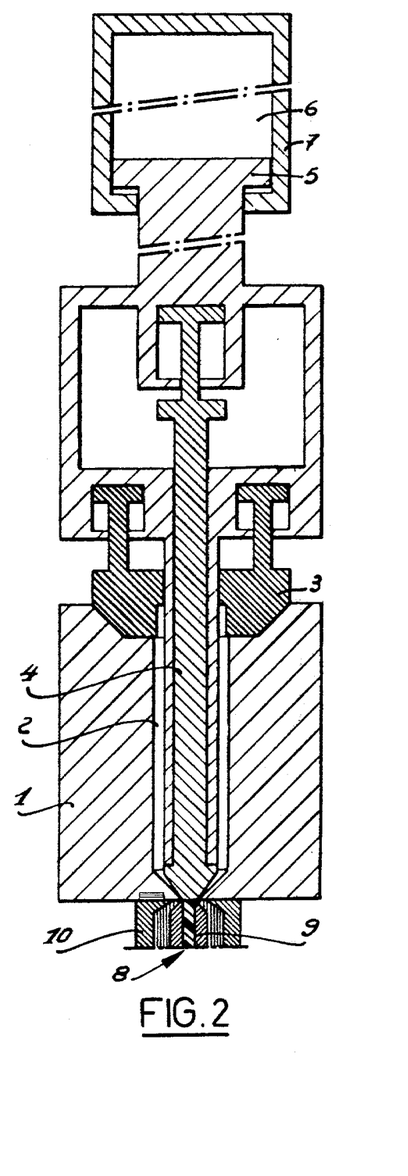

The punch 4 subjected to an adjustable restraining action by the piston 5, prevents the plastics material from freely penetrating into the cavity 2 and conrols the flow of the material. This punch is subjected to a variable pre-settable restraining action which can be constant or programmed or may be a function of the factors relating to the material introduced into the cavity 2 (temperature, pressure, viscosity, internal cohesion etc.). The few millimeters of plastics material situated at the end of the nozzle are generally at a temperature slightly lower than that of the rest of the plastics material, the mold being colder than the nozzle 8. By bringing this "cold plug" into contact with the end face of the punch it is caused to "stick" to the punch. This locates this portion of plastics material which, because of the repetitive nature of the manufacturing method and of the cooling of the material, will not have undergone the same heating history as the rest of the material used for producing the blank.

Thus in particular this "plug" of material is prevented from shifting and moving into an uncontrolled position in the blank where it is not required and where it would form a heterogeneous zone.

2. The plastics material is then forced by the press into the cavity 2 (see FIG. 3). Since the "plug" of material is fixed on the end face of the punch, the latter moves back under the pressure of the material which is greater than that of the restraining action of the punch, and the material flows evenly round the "plug" and gradually rises in the cavity 2 in a uniform manner without completely filling it.

Figure 3:
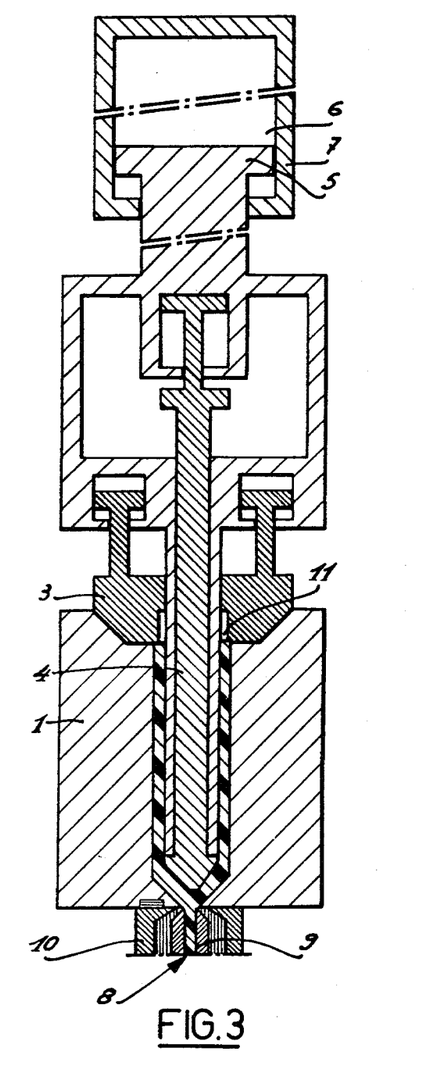
Figure 4:
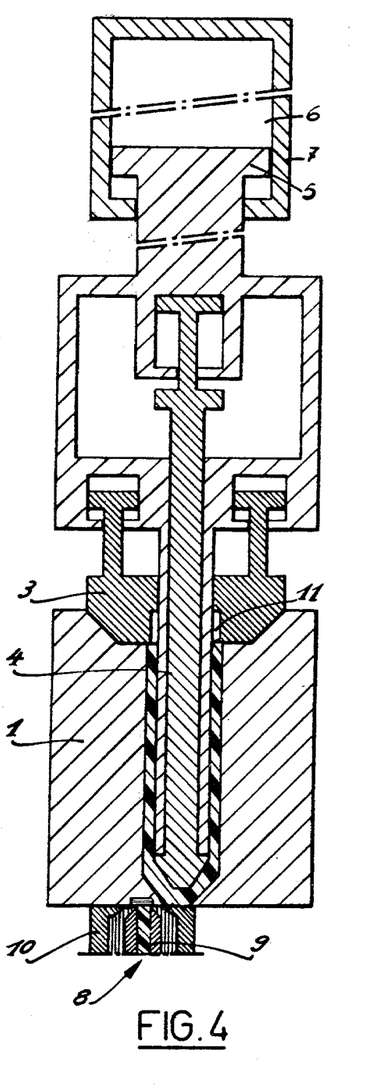

While the material is being introduced in this way, it is not subjected to any compression or restraint and it flows freely around the punch 4 which, because of its restraining action, offers resistance to this flow of material and, by automatic balancing of its longitudinal position in the cavity, causes laminar flow of the material and controls the flow so as to achieve the greatest possible uniformity in the filling of the cavity.

3. The nozzle 8 is then displaced relatively to the die 1, and the cold surface 10 is brought into contact with the section of plastics material that has been sheared by this displacement.

Figures 5, 6, 7:
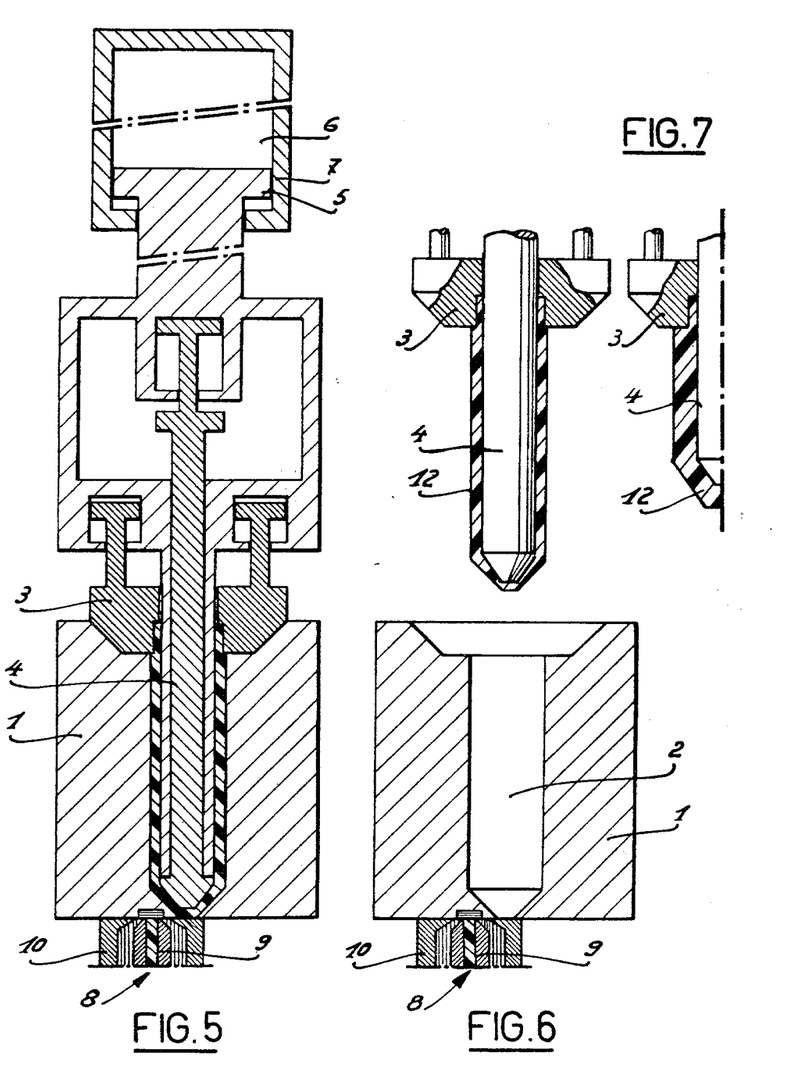
FIG. 7 illustrates an optional additional stage.

4. The pressure of the material delivered by the nozzle 8 having been removed, the punch 4 then causes compression of the material trapped in the cavity 2 which is then completely filled. In this compression stage it is also possible to apply to the punch 4 a pressure that is greater than its restraining action. During this compression the "plug" of material is held between the cold surface 10 and the front face of the punch and cannot escape on either side so that complete uniformity of the object or blank is ensured (see FIG. 5).

Finally, the punch 4 is withdrawn from the cavity 2 and carries with it the object or blank 12. The latter may, at this stage, be sufficiently cooled to be dimensionally stable, or it may still be malleable. In the latter case it is possible to allow it to cool on the punch 4, which generally involves a retraction of the material. This retraction, controlled by the retraction of the punch, may be utilized for obtaining a blank with a thicker wall, provided a shorter blank can be accepted. This may be important in certain cases, since experience has shown that there are optimum thicknesses for the introduction of the material into the cavity 2. Thus, for the production of a thick-walled blank, it is nevertheless possible to introduce the material into the mold while taking into account this optimum thickness which is smaller, over a greater length, and to retract the punch to cause increase in the wall thickness of the blank (see FIG. 7). In this case the punch is free to move in relation to the closure member so as to enable this retraction to take place.

When it is required to produce objects having very thin walls, it is possible to carry out a mechanical stretching operation on the blank extracted from the cavity by the punch, the neck of the blank being held in the member that closes the die 3, and the punch being displaced relatively to the die. Finally, for the purpose of imparting particular properties or stresses to the material of the blank, the latter can be drawn, allowed to contract and then drawn again.

In a variation, not illustrated, it is also possible to introduce the punch, carrying the blank still in the malleable state, into a cold cavity and to compress the blank a second time therein in order to stabilize its dimensions.

When the required blank has been obtained, it can either be stored or be immediately used for forming an article, for example by introducing the punch, carrying the blank still at a forming temperature into a shaping or finishing mold.

Because of their uniform nature and their internal symmetrical stresses, the blanks obtained in this way can be shaped by any of the known processes to obtain a required article.

It is obvious that the invention has been described by reference to a particular form of construction of the apparatus, but numerous modifications are possible.

The blank does not in fact need to be a hollow cylinder; it may be constituted by a hollow cone or even by a disc, and this will depend upon the shape of the cavity 2 and of the punch 4.

It will also be appreciated that use can be made of a nozzle other than the lateral-displacement type illustrated. To obtain the required results it is in fact sufficient to provide for the following:

1. Location of the "plug" of plastics material within the cavity of the die prior to the introduction of the plastics material into this cavity.

2. Introduction of the plastics material into the cavity of the die without subjecting it to pressure or restraint other than laminar flow around the "floating" punch, i.e. displacement relative to the cavity and against an adjustable pressure.

3. Compression of the plastics material in the cavity by the punch.

All the experiments so far carried out have in fact shown that the important stage in the process for obtaining a blank is the introduction of the material into the die cavity; this has to be carried out in a symmetrical and uniform manner and against a restraining action which is determined by the factors affecting the material used (pressure, temperature, viscosity etc.).

It should also be pointed out that the openings of the nozzle and of the cavity are large, i.e. several square millimeters, so that the cavity can be filled in a uniform manner with plastics material.

Ideal filling of the cavity is represented by uniform distribution of material around the "plug," which has been located symmetrically in relation to the cavity. This uniform distribution of the material results, by laminar flow between the walls of the mold and the surface of the punch in a gradient in the rate of flow of the material such that interior zones of the material enter the cavity in such a way that this material is kept away from the cavity walls and the surface of the punch by layers of plastics material already introduced into the cavity.

This feature is exploited when it is required to produce blanks having composite walls (FIG. 9), that is to say blanks formed from two or more different plastics materials.

Figure 9:
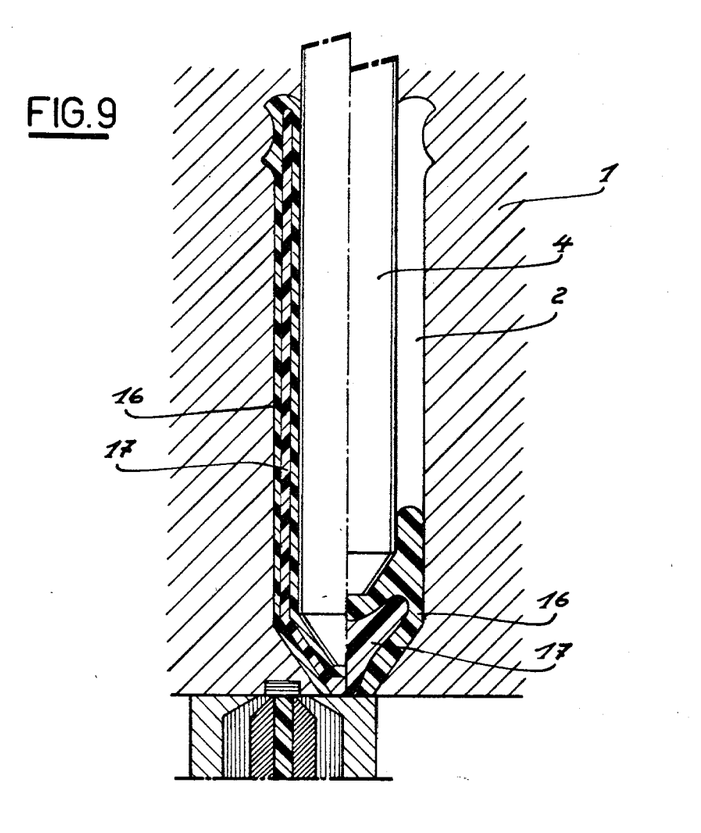
FIGS. 9 and 10 illustrate in section how the material is introduced into and mold cavity to produce an object having a composite wall.

Then, in the manner described above, the cavity of a mold is filled with a quantity of plastics material formed by a first lot of a first material 16, but when the mold is partially filled, the nozzle in use is replaced by another nozzle by lateral displacement for example, and this other nozzle in turn introduces a second lot of another plastics material 17 into the cavity 2. This second plastics material 17 bears against the first material 16 which forms a sheath and is pushed away by the second material so that it is brought against the walls of the die 1 and the surface of the punch 4. The amount of the first material is so selected that when the cavity is completely filled said material forms a continuous skin, starting at the filling orifice of the die, which skin covers the walls of the cavity 2 and the surface of the punch 4, the second material 17 being encapsulated within this covering formed by the first material.

It is thus possible to obtain articles, of which the inner and outer walls are both of a material having particular properties, while the core, made of another material, provides other properties. At least one of the materials may incorporate an expanding agent to offset the contraction and to ensure good cohesion or adhesion of the core 17 within its protective skin. It is thus possible to obtain an object having a composite wall by using incompatible materials, since the bonding of the two components for the wall is not achieved by chemical means, but mechanically by encasing one material in the other.

Figure 10:
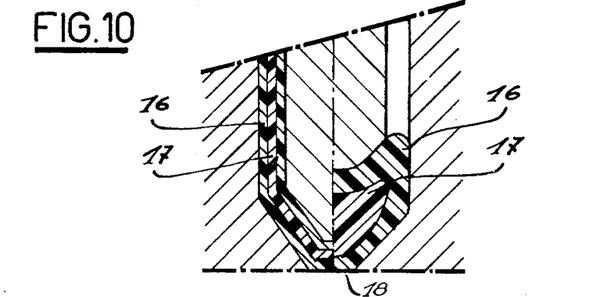

In order to enclose the second material completely within the first, a final small quantity 18 of the first material is introduced into the cavity 2 (see FIG. 10).

Figure 8:
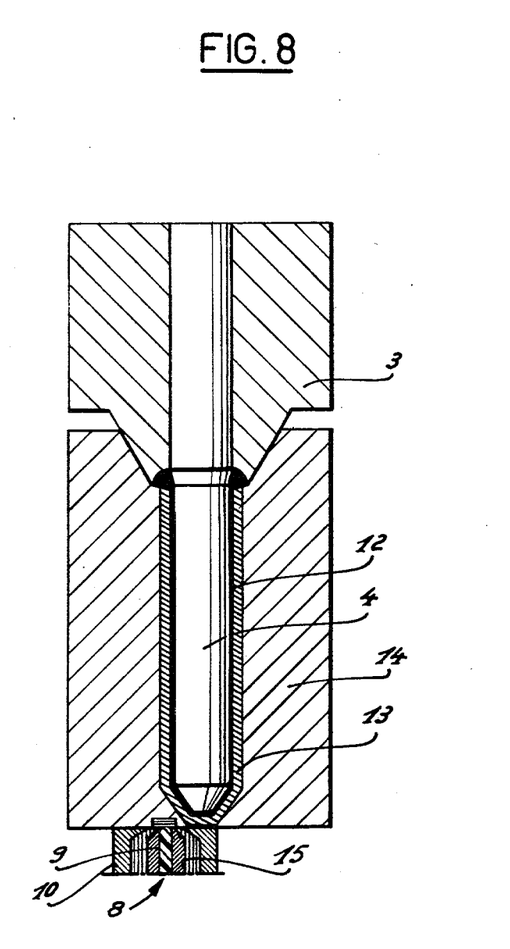
FIG. 8 illustrates how a blank having a composite wall may be produced.

Another method of producing composite blanks with the apparatus of the invention is illustrated in FIG. 8. A first blank is formed in the manner as described by reference to the drawing.

Then, this blank, after having hardened sufficiently, is covered with a second layer 13 in a second cavity 14 by means of a second nozzle 15 but in exactly the same manner as was used with the first nozzle. These operations can be repeated as required with a plurality of materials. This mode of operation is made possible by the low speed and the low pressure at which the material is introduced (large nozzle and large die openings), since no damage is thereby caused to the first layer of material, secured to the punch, when the second layer of material is being introduced.

A third method of obtaining a composite blank, intended to be formed into an article, consists in manufacturing two objects such as those obtained by the above-described method but having dimensions such that one can be fitted into the other. These two objects, which may be in different materials, incompatible or otherwise, are placed one within the other and the finished article is then formed.

Finally, again for the purpose of obtaining an article having a composite wall, it is possible, after having formed a blank in the manner described above, to remove the blank from the die by leaving it mounted on the punch, and then to apply a fine layer of some other plastics material to the object by dipping or some other coating method.

To achieve better distribution of stresses in the blank, the punch and the die can be rotated relatively to each other during the entire period in which the material is being introduced into the cavity.

One of the main advantages of the invention described consists in its ability to provide blanks which, because of the absence of internal stresses or because the stresses are controlled, are capable of being shaped by any known process.

A further advantage of this invention consists in the fact that there is no wastage of plastics material, the entire amount of plastics material introduced into the mold cavity being used for forming the required object. This is particularly important in the case of articles made of two materials since here the separate recovery of the materials is impossible in practice.

The installation or apparatus for carrying out the method described has an important basic characteristic. The punch 4 is only displaceable axially. This enables it to be centered very accurately. All the lateral movements required in the operating cycle, in transferring the blank to a shaping cavity etc. are always achieved by lateral displacement of dies, inlet nozzles, plasticizer if required and the shaping cavities, if the punch enables the articles to be shaped by blowing.

This conception of an installation for the hot-shaping of a blank and/or of a finished article is original and greatly simplifies the mechanical problems involved in such an installation. Everything hinges upon a punch which is displaceable linearly only along the line of its own axis. The dies, nozzles and shaping cavities can be indexed and brought in turn into alignment with the punch in sequences required by the desired manufacturing cycle.

In the apparatus described, the orifice for introducing the plastics material is formed at the base of the die. This position of the orifice in the mold may be varied, and in particular the plastics material may be introduced through the punch.

Having described the apparatus for the manufacture of plastics material articles, it will now be of interest to point out some particularly important features for the optimum manufacture of articles therewith.

As seen before, one of the difficult problems is the homogeneous introduction of the material through the nozzle into the space comprised between the walls of the die cavity and of the punch. Another difficulty resides in keeping the concentricity between the punch and the mold during the intrusion of the material.

Figure 11:
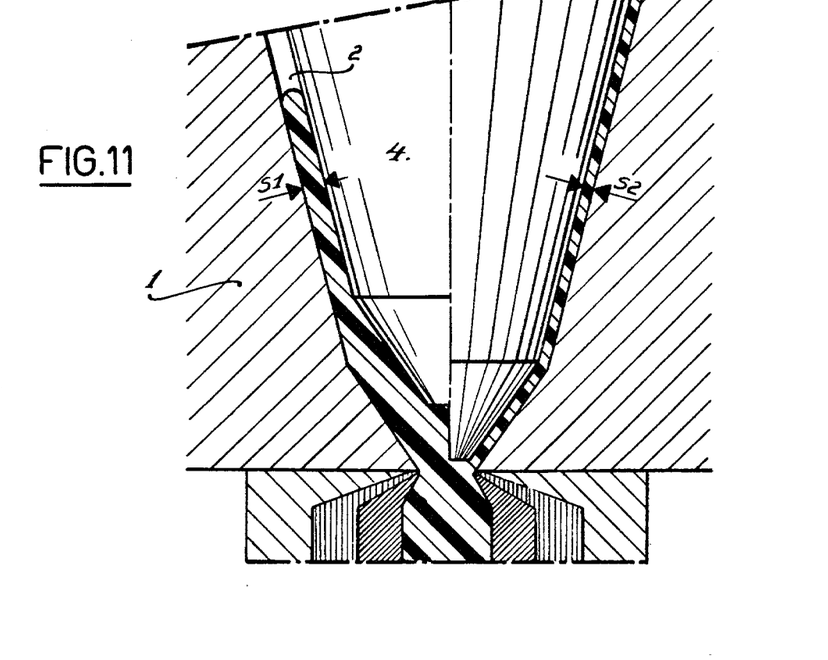
FIG. 11 shows a conical punch working in a conical die, the left portion of the figure showing the introduction of plastics material and the right portion the compression of said material.

In using a mold 1 having a conical cavity 2 (FIG. 11) and a punch 4 also conical, we may vary the thickness of the plastics material between the time of its intrusion (left side of FIG. 11) and the time of its compression (right side of FIG. 11). During the intrusion of plastics material into the cavity 2, the distance separating the punch 4 from the die is relatively great, enabling an easy flow, under low pressure and with a low lamination rate of the material. This reduction of the intrusion pressure permits simultaneously the obtention of a more homogeneous mass of material and a very important reduction of the mechanical stresses applied to the punch 4. The reduction of these stresses helps to maintain the concentricity of the punch with respect to the die as well during the material intrusion as during its compression.

Figure 12:
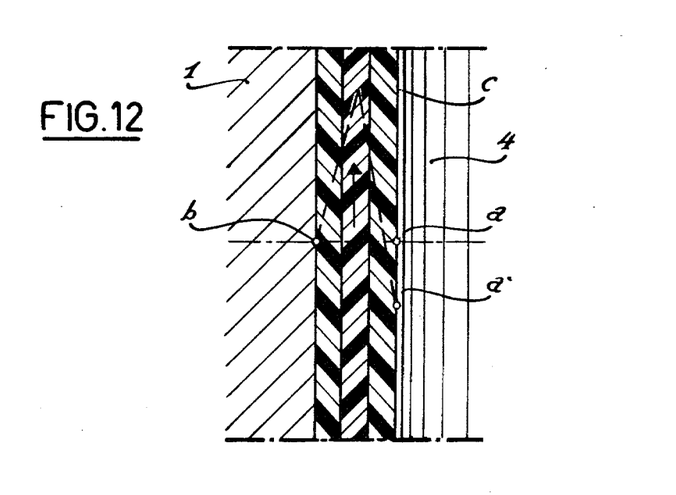
FIG. 12 shows the movements within the material during compression of the blank.

One knows that according to the plastics materials used, the orientation of the material in the cross section of the article may determine its mechanical properties. Through the described invention, one obtains a first orientation of the material during its intrusion between the punch and the mold. In fact, as the material is introduced within itself (FIG. 12), the particles of material located either in the vicinity of the punch a or of the wall cavity b, tend to remain behind with respect to a particle of material c located at the center of the wall of the blank despite the fact that all these particles were located in the nozzle in a same cross section of the material. A stretching is thus obtained within the material causing an orientation of its particles during the intrusion phase. Then, this orientation of the material is further accentuated during the compression phase. As a matter of fact, the particle a of material located against the punch is displaced to a' by means of the relative displacement of the punch and of the mold during the compression.

The tests made show that this phenomenon of orientation could be the cause in enhancing the mechanical properties of articles made according to this method.

A critical point for the realization of the installation to carry out the method is the realization of the intrusion nozzle. In fact, the material has to remain in the nozzle at a temperature which is higher than that of the mold.

Figure 13:
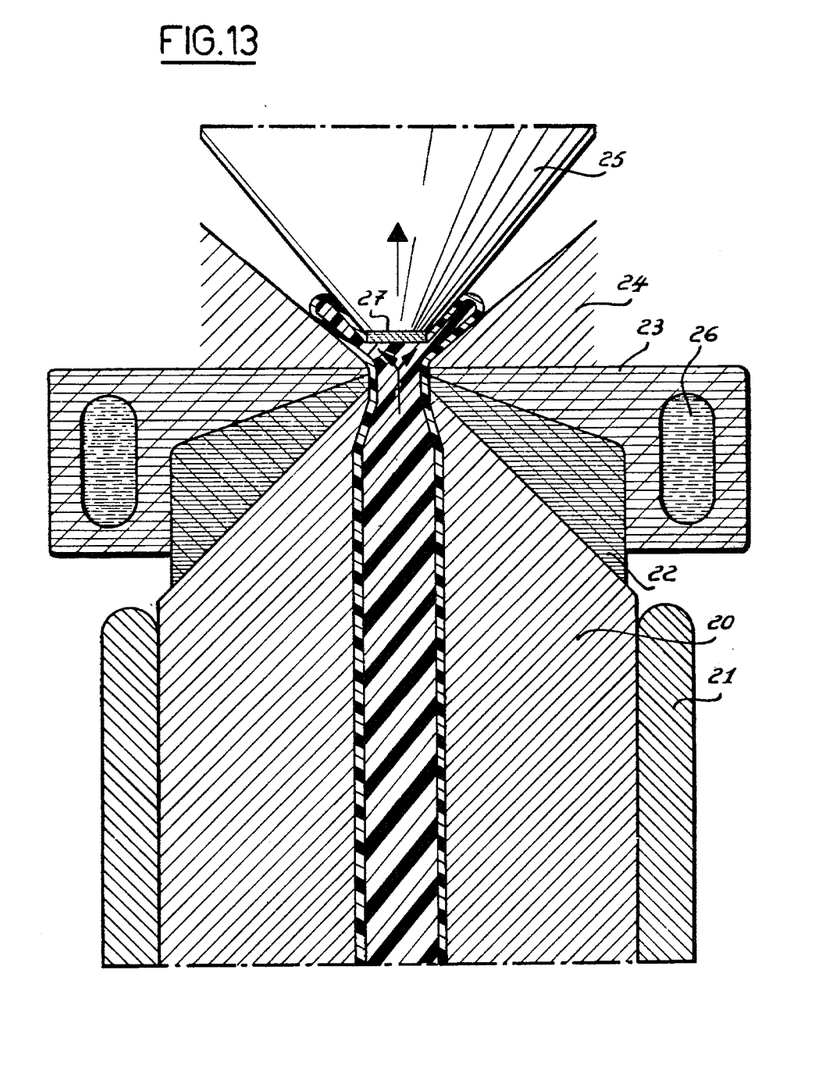
FIG. 13 shows a detail of the intrusion nozzle.

FIG. 13 shows a particular nozzle which comprises a body 20 having a temperature stabilizing circuit 21. This body 20 terminates in a conical portion surrounded by a cone 22 made of insulating material, separating this body from a cap 23 the upper surface of which rests against the mold 24. This cap 23 comprises also a temperature stabilizing circuit 26 as well as the mold 24 and the punch 25. Generally the temperature of the cap 23 is maintained at the same value as the temperature of the mold 24.

In that way the plastics material is maintained up to the forward end of the nozzle at the temperature of the nozzle body. The critical zone for the formation of the plug 27 of "cold" material is then kept as small as possible.

Furthermore, in order to place the plug 27 against the frontal face of the punch during the intrusion, it is necessary that the opening of the mold and the aperture of the nozzle have about equal dimensions and that the shape of the cavity in that region be such that even under the shearing effect due to the lateral displacement of the nozzle for closing the die, this plug does not escape laterally between the cavity and the punch, even partially.

To avoid the formation of a plug of "cold" material, one may, after having closed the nozzle, cause a decompression of the material, separating this material from the lower surface of the mold which obturates the nozzle. This decompression may be obtained by an axial withdrawal of the plastification screw.

FIGS. 14, 14a, 14b and 14c show schematically a modification of the method enabling the production of articles having a bi-axial orientation of the material.

Figures 14, 14A, 14B, 14C:
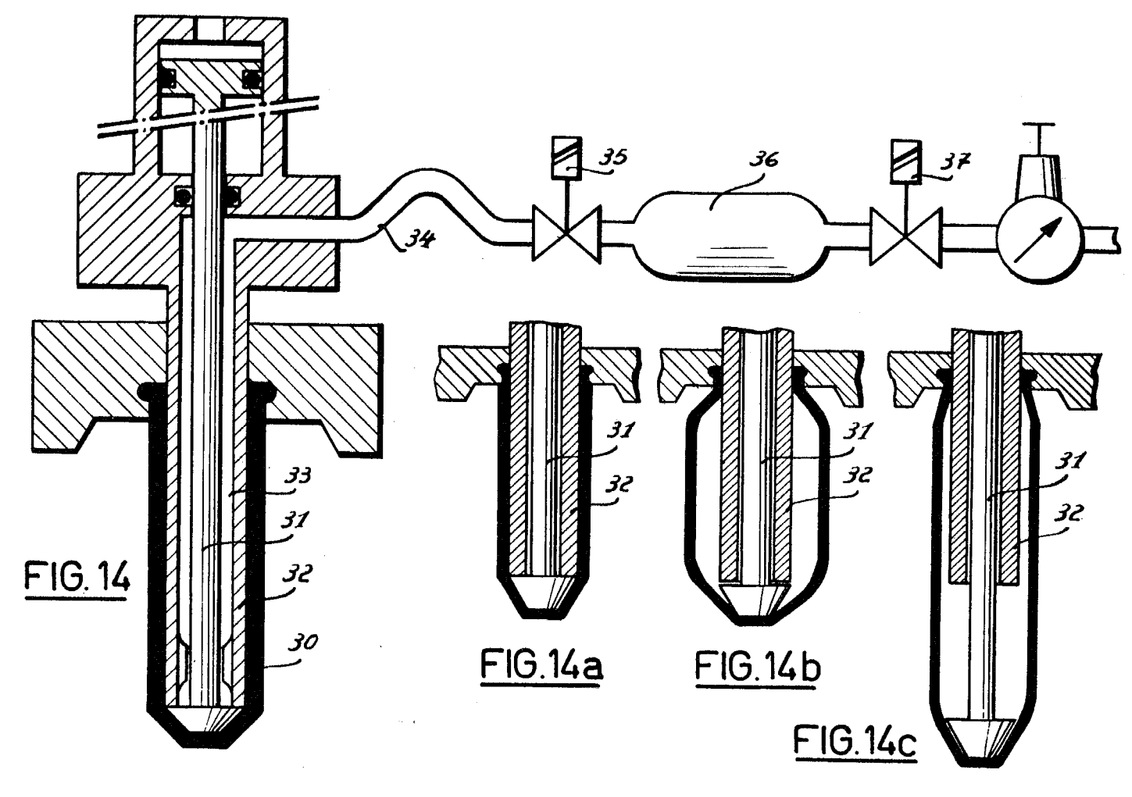

The blank 30 is made as hereinbefore described, then the punch is axially retracted out of the mold, taking the blank 30 with it. The punch is made, as in preceding embodiments, in two parts sliding the one 31 within the other 32, providing between them a free space 33. This space 33 is connected by a duct 34, a first valve 35, a container 36 and a second valve 37, to a pressurized air supply.

During the formation of the blank the container 36 is filled with a determined quantity of air, the valve 37 being open and the valve 35 closed. The desired air quantity being in the container, the valve 37 is closed. Immediately after the withdrawal of the punch outside the mold, the valve 35 is opened and the blank is inflated (FIG. 14b) in the ambient air. The material is sufficiently homogeneous for this inflating to be symmetrical. Then (FIG. 14c), the inside part 31 of the punch is downwardly displaced causing a mechanical stretching of the blank. This inflated and mechanically stretched blank is then placed in a finishing mold by means of an axial displacement of the punch and blown into its definitive shape by means of opening the two valves 35, 37.

Another feature of the apparatus is that the punch moves only axially along its longitudinal axis. The die and finishing mold are displaced laterally to be centered successively with the punch. Therefore the axial stroke of the punch is reduced to a value slightly greater than the height of one mold. As a consequence, the installation is easier to manufacture, the centering of the punch is easy, the stresses are less and the machine is stronger.

Figure 15:
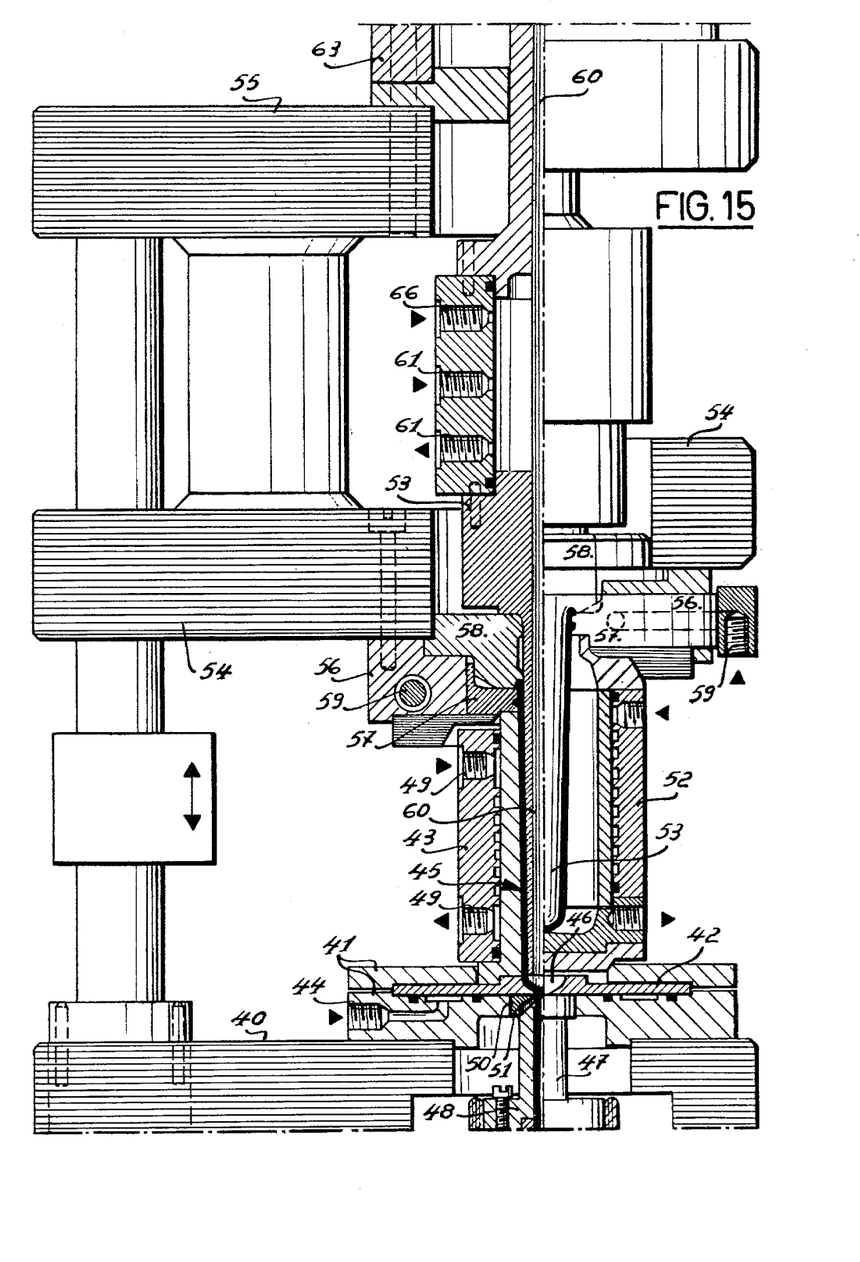
FIGS. 15, 15' show an embodiment of an installation to carry out the method according to the invention.

FIGS. 15, 15' show a practical realization of the apparatus. (FIG. 15' shows the upper part of the device).

This installation comprises a table 40 on which rests a nozzle closing device. This device comprises a support 41, at least one part of which 42 is maintained at the same temperature as the mold for the blank 43. A temperature stabilizing circuit 44 is provided therefore. In this embodiment, the part 42 forms simultaneously a portion of the mold. In fact, when the mold 43 is centered on the support 41, the cavity 45 of the mold 43 for the blank is terminated by the housing 46 of the part 42.

A nozzle is fixed under the table 40 which is fed with plastics material by means of a press not shown. This nozzle 47 has a large aperture and its body 48 is maintained at a temperature corresponding to the temperature of the fused plastics material by means of a temperature stabilizing circuit. This temperature is higher than that of the mold 43 which is also stabilized as to temperature by means of a circuit 49. This nozzle has a cap 50 thermally insulated from the body 48 by means of an insulating material 51 so that this cap is always at the same temperature as the part 42 of the support and thus of the mold.

The mold is laterally displaceable and can be replaced by a finishing or blowing up mold 52 (right part of FIG. 15), when the punch 53 is in its upper position.

The installation comprises two bridges 54, 55, fixed the one with respect to the other but displaceable axially together with respect to the table 40. The bridge 54 carries an upper centering device 56 for the mold 43 or 52. This upper assembly 56 comprises the portion of the mold 57 constituting the neck of the plastics material article and a guiding block 58 for the punch 53. Hydraulic jacks, not shown, control the axial displacements of the bridges. It is evident that this upper assembly 56 has also a temperature stabilizing circuit 59.

The punch 53 comprises an internal sliding part 60 forming its lower end; the whole being temperature stabilized by a circuit 61. The whole punch is carried by the upper bridge 55 and is displaceable with respect to said bridge. A piston 62 fast with the punch 53 slides in a cylinder fast on the bridge 55. A hydraulic control circuit 64 controls the displacements of the punch 53 with respect to the bridge 55 and its position within the cavity 52.

When the blank mold is closed by the movement of the bridge 54 and the punch is located in this mold in the material intrusion position, it is possible thereafter to cause compression of said material by means of the control circuit 64 causing a subsequent lowering of the punch up to its position shown in the left part of FIG. 15.

A second control circuit 65 is provided to displace the frontal portion 60 of the punch and air is blown through an opening 66 between this portion 60 and the punch 53 to inflate the article within the finishing mold 52 or to stretch the blank.

The height over which the bridges 54, 55 and the punch displaces is slightly greater than the height of the mold 43 or 52. A reduced stroke permits a good centering and a high rigidity of the whole installation. This is obtained due to the fact that the molds 43 and 52 are laterally removable. Their centering in working position is precise and easy to obtain, they are pressed between the support 41 and the centering assembly 56. Conical rest surfaces can be provided to improve the centering.

It is to be noted that the use of a shearing nozzle which enables separating completely the hot nozzle from the blank, which is maintained against a cold surface during the compression phase, is particularly advantageous for working with thermoplastic polyesters. One avoids therewith a crystallization of the material which preferably appears for hot zones.

Figure 16:
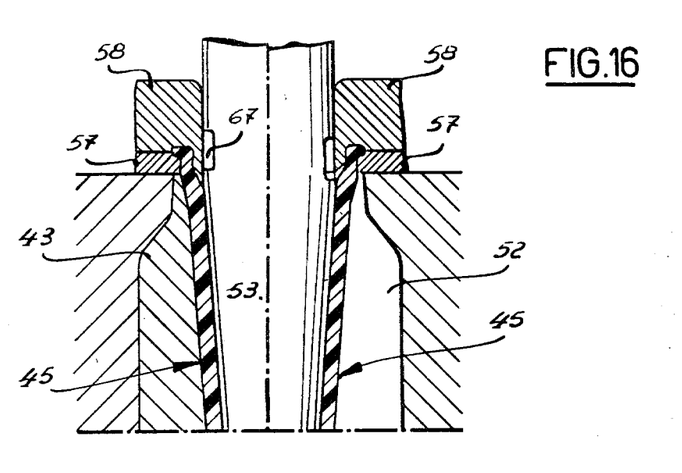
FIG. 16 is a partial cross section showing a variant of the punch of the installation.

FIG. 16 shows partially one embodiment of an installation in which the punch 53 is manufactured in one piece. This punch comprises a blowing groove 67. This punch 53 is axially displaceable with respect to the guiding block 58 or to the ring 57. During the introduction of material and its subsequent compression, the punch is in the position shown in the left half of the FIG. 16; the blowing groove 67 is closed.

When the punch is in blowing up position, for blowing up the blank in a finishing mold it is in the position shown in the right half of FIG. 16; the blowing groove 67 is fixed and air is distributed through ducts (not shown), provided in the guiding blocks 58, to said groove to blow up the blank. This punch can also comprise similar grooves (not shown) for the filling of the article formed by a liquid.

What is claimed is:

1. Apparatus for producing an object made of plastic material, comprising a mold comprised by a hollow die having an open end for the reception of plastic material, a punch having a free end and having an external diameter smaller than the internal diameter of the die, means for reciprocating said punch in the die toward and away from said open end to close and respectively open said end of said die, the internal side walls of said die adjacent said end thereof tapering toward said end thereof whereby said end thereof is of a diameter smaller than the greatest internal diameter of the die, said punch adjacent said free end tapering to a smallest diameter at said free end which is substantially the same as the diameter of said end of said die, said free end of said punch being flush with the outer surface of the die when the punch closes the die, and a nozzle having a duct therethrough for supplying plastic material under pressure to the die, the nozzle being slidable on the die between a first position in which the duct is out of registry with the open end of the die and a second position in which the duct is in registry with the open end of the die, the die closing the duct in said first position and the free end of the punch closing the duct in said second position when the punch closes the die, the punch and die in said second position defining between them a mold cavity that surrounds the punch.

2. Apparatus as claimed in claim 1, the taper of said die forming a larger acute angle with the axis of the mold than does the taper of said free end of the punch.

* * * * *